United States Patent [19]

Dikler et al.

[11] 4,146,669

[45] Mar. 27, 1979

[54] CROSSLINKING AGENT, METHOD OF PRODUCING SAME AND PAPER MADE WITH THE USE THEREOF

[75] Inventors: Yakov E. Dikler; Vladimir E. Guryanov, both of Moskovskaya oblasti; Boris D. Korolkov, Serpukhov Moskovskoi oblasti, all of U.S.S.R.

[73] Assignee: Tsentralny Nauchno-Issledovatelsky Institut Bumagi (TSNIIB), U.S.S.R.

[21] Appl. No.: 758,855

[22] Filed: Jan. 12, 1977

[51] Int. Cl.² .................... B32B 29/04; B32B 29/06
[52] U.S. Cl. .................................. 428/328; 428/420; 428/532; 428/535; 428/537; 428/539
[58] Field of Search ............... 428/532, 533, 535, 537, 428/539, 420, 328

[56] References Cited

U.S. PATENT DOCUMENTS

| 2,256,853 | 9/1941 | Schwartz | 428/533 |
|---|---|---|---|
| 3,425,896 | 2/1969 | Hart | 428/533 |
| 3,702,779 | 11/1972 | Fadner et al. | 428/533 X |
| 3,808,038 | 4/1974 | Ueno et al. | 428/532 |
| 4,008,116 | 2/1977 | Sebel | 428/533 |

*Primary Examiner*—Harold Ansher
*Attorney, Agent, or Firm*—Robert E. Burns; Emmanuel J. Lobato; Bruce L. Adams

[57] ABSTRACT

A characteristic feature of the present invention is that the crosslinking agent comprises grains, each grain having a nucleus consisting of a substance inert to the substance forming crosslinks with hydroxyl-containing water-soluble polymers, and an external layer surrounding said nucleus and containing compounds of tetravalent metals selected from the group consisting of titanium, zirconium, hafnium and tin.

The particles for the chemical treatment of hydroxyl-containing water-soluble polymers can be prepared by applying a substance capable of forming crosslinks with the hydroxyl-containing water-soluble polymers on inert, finely dispersed particles and by hydrolytically treating this substance so as to form an external layer of the grain.

This method can be used for making paper having a fibrous base with a coating containing hydroxyl-containing water-soluble polymers treated with a crosslinking agent in the form of grains, each grain having a nucleus consisting of a substance inert to the substance forming crosslinks with said hydroxyl-containing water soluble polymers, and an external layer surrounding said nucleus and containing compounds of tetravalent metals selected from the group consisting of titanium, zirconium, hafnium and tin.

17 Claims, No Drawings

CROSSLINKING AGENT, METHOD OF PRODUCING SAME AND PAPER MADE WITH THE USE THEREOF

BACKGROUND OF THE INVENTION

The present invention relates to substances capable of forming chemical crosslinks between macromolecules of polymers, and more particularly to a crosslinking agent, to a method of producing same and to paper made with the use thereof.

The present invention can be used in various branches of industry, since it refers to the field of double-stage processes for fabricating articles from polymers.

The double-stage nature of these processes involves a first stage in which an article is shaped from a solution or melt of a polymer capable of dissolving or melting, while during the second stage, the polymer, in the form of a shaped article, is rendered nonmelting and insoluble by chemically crosslinking its macromolecules. Crosslinking can be carried out through radiation, thermal, or chemical treatment. In the latter case special bi- and polyfunctional chemical compounds, known as crosslinking agents are used, and the physico-chemistry of the double-stage character of these processed polymers does not necessarily rule out the possibility their realization in one technological stage in a single apparatus or unit.

For crosslinking a wide range of polymers various crosslinking agents are used, depending upon the kind and number of groups in the polymer prone to chemical crosslinking.

Crosslinking of hydroxyl groups of polymers in an aqueous solution presents greater difficulties than crosslinking of carboxyl, amine, imino or amide groups of water-soluble polymers. Organic and inorganic substances and mixtures thereof are used as crosslinking agents for hydroxyl-containing water-soluble polymers.

Producing diverse polymeric coatings is a particular field where a double-stage process may be used. Ease, safety and technological efficiency of producing is required of the coating production techniques, whereas resistance to outside effects, such as moisture and atmospheric oxygen, resistance to various active chemicals, solvents and temperature gradients over a long period of time is required of the coating applied. The coatings formed from chemically crosslinked hydroxyl-containing water-soluble polymers by treating said polymers with crosslinking agents particularly meet all the above-mentioned requirements.

Fabricating nonwoven materials requiring formation of the links between the fibers of the nonwoven material base, resistant to atmospheric effects, secretions of the human body, foodstuffs and laundering is another field utilizing double-stage processes. Such resistance can be achieved by impregnating the fibers with hydroxyl-containing water-soluble polymers, followed by crosslinking of the latter.

One of the applications of double-stage processes is bonding together various surfaces with crosslinking adhesives, whereby the bonding effect can be achieved through the use of hydroxyl-containing water-soluble polymers crosslinked after the adhesive layer has dried up. A very important requirement is fulfilled therewith: crosslinking can proceed with sufficient rapidity at room temperature of 25° ± 10° C.

Production of man-made fibers which can be spun from aqueous solutions of hydroxyl-containing polymers and crosslinked after their spinning is a special field of realization of double-stage processes. These fibers are highly hydrophilic while clothing made from such fibers is hygienic wearwise and possesses low-crease properties.

It is also expedient to employ a double-stage process for sizing textile fibers, using solutions of hydroxyl-containing water-soluble polymers, as sizing media, such polymers, being chemically crosslinked after application on the fibers. Such sizing media can be easily imparted with antistatic, friction, hydrophilic and delustering properties.

The double-stage process can also be used for the fabrication of sound- and heat-insulation boards with the use of aqueous solutions of crosslinked hydroxyl-containing polymers as binders for fibrous materials. A field of traditionally wide use of crosslinked coatings produced through a double-stage process from hydroxyl-containing water-soluble polymers in papermaking, where these coatings are applied using size presses, calenders, paper coating and baryta coating machines and ensure high resistance to water penetration combined with high hydrophilic capacity of the surface. These coatings can be used for making writing, printing and packing paper, as well as for making a number of technical grades of paper such as base of photographic, drafting, drawing, diagram and cartographic paper, paper for office-keeping and paper for computing machinery.

A new field of application for a double-stage process is production of synthetic paper, particularly of synthetic film paper where the crosslinked film itself, formed from an aqueous solution of hydroxyl-containing polymers, possesses paper-like properties, and can be used in a number of specific cases where "conventional" paper is inapplicable.

On the one hand, most diverse bi- and polyfunctional substances, both organic and inorganic, can be used as crosslinking agents, since only the capability of forming chemical crosslinks between at least two molecules of the polymer is required of the crosslinking agent molecule. On the other hand, specific classes of crosslinking agents are required for each type of the polymer functional groups. A large number of water soluble film-forming polymers contain hydroxyl groups. Some very important water-soluble polymers, e.g. polyvinyl alcohol or starch, do not contain any other groups prone to chemical crosslinking except hydroxyl groups.

Crosslinking of hydroxyl groups in an aqueous solution is a very complicated task, since the water molecule is a hydroxyl bonded with hydrogen. Therefore, the majority of compounds capable of reacting with the hydroxyl group resulting in the formation of chemical crosslinks, will actively interact, first of all, with the water molecules forming chemical compounds incapable of further interaction with the polymer hydroxyl groups. Since the concentration of aqueous solutions of polymers does not normally exceed 20 wt.% and their molecular weight is not below 2,000, molar water concentration (content: 80 wt.%, molecular weight: 18) is hundreds of times higher than the polymer molar concentration (in the above-mentioned extreme case 20% polymer with the molecular weight of 2,000, by a factor of 440). Hence, it is essential that crosslinking agents be used which interact selectively only with the polymer hydroxyls and do not react with hydroxyls of water non-reactive products. For this reason the majority of crosslinking agents are inapplicable for crosslinking hydroxyl groups in aqueous solutions of polymers. Here it will be appropriate to explain why particular attention is paid to water-soluble hydroxyl-containing polymers.

In order to apply an integral non-porous coating film e.g. on paper, solutions of film-forming materials with maximum possible concentrations should be used, since in case of maximum concentration of the solution, the reduction in the layer volume during drying will be minimum. This statement is based on the fact that the polymer solution is transformed to a non-flowing state when the polymer concentration in the solution equals to 1–25 wt.%. After the polymer solution has been transformed to a non-flowing state, gel for example, the initial volume of gel under fast drying conditions decreases nonlinearly in relation to the amount of solvent being removed, namely, the solvent removal rate is ahead of the polymeric gel volume decrease, due to the fact that the stress relaxation time in the polymeric gel is comparable with the solvent removal rate and increases as the solvent is being removed. Therefore, the polymeric carcass of the gel undergoes evergrowing stresses during drying, and its integrity is disturbed. The film of the resulting coating becomes porous, and is no longer a barrier to the penetration of liquid.

In addition, with higher concentrations of the solutions their viscosity increases, thus decreasing the solution penetration into paper and also promoting formation of an integral film on the paper surface. Many kinds of water-soluble polymers form fluid solutions with the polymer concentration over 10%.

For the majority of the paper grades a hydrophilic surface is required, i.e. the surface wetting angle with water should be below 90°; application of a coating from water-soluble polymers is the simplest way of complying with said requirement. Hydrophilic properties, as has been already noted, are also required for nonwoven materials as well as for many kinds of textile fibers, and in these cases water-soluble polymers also offer easy solution of this problem.

The problem of the solvent removal always arises when using a polymer solution. Water is the only non-toxic and least expensive polymer solvent. When using aqueous solutions, the problems of sealing the equipment, of solvent recovery and fire hazards do not arise. Hence, it is always preferable to use aqueous solutions of polymers.

Aqueous dispersions of polymers also have the last-mentioned advantage of the presence of water as a dispersion medium, but dispersions have two substantial disadvantages as compared with polymer aqueous solutions.

The first disadvantage resides in that coalescence of the dispersion particles into an integral film occurs when heating to temperatures, as a rule, over 100° C., which is difficult to attain during paper drying (due to its inevitable overdrying, unfavorably affecting all the paper properties) as well as during finishing textile fibers, synthetic fibers particularly.

The second specific disadvantage of aqueous dispersions of polymers is that they are liable to coagulation in the event of slight changes of external conditions and composition, for example, with changes in their temperature, pH, ionic strength of solution, or with addition of polyelectrolytes.

The above-mentioned factors are responsible for the important part played by water-soluble polymers and for the possibility of their extensive application in various branches of industry.

The overwhelming majority of the known film-forming water-soluble polymers contain hydroxyl groups. Hydroxylcontaining water-soluble polymers are proteins (gelatin, casein etc.), cellulose esters, starch and its derivatives, dextrines, acrylic and methacrylic acid copolymers, alginates and polyuronides (agar-agar, for example), polyvinyl alcohol and its water-soluble derivatives.

Hence, the agent capable of crosslinking hydroxyl groups of water-soluble polymers can find wide application. In most cases, for the reasons stated above, inorganic substances are used for chemical crosslinking of the hydroxyl-containing water-soluble polymers. Selective interaction of inorganic substances that are compounds of metals belonging to Groups II–VI and the iron Subgroup of the Periodic System is associated with the formation of chelate compounds.

Compounds of bivalent calcium, magnesium, zinc, copper and cobalt; trivalent boron, aluminum, chromium, iron and nickel; tetravalent tin, lead, titanium, zirconium and hafnium, as well as of pentavalent vanadium, taken either in combination or separately, are known in the art as inorganic crosslinking agents for hydroxyl-containing water-soluble polymers. Compounds of tetravalent titanium and zirconium, as well as of trivalent boron, taken either in combination or separately, are most extensively used as crosslinking agents for hydroxyl-containing water-soluble polymers.

If the criterion used for estimating the crosslinking activity of substances is the minimum ion concentration of a selected crosslinking agent, sufficient for the conversion of an aqueous polyvinyl alcohol solution with $\geq 5$ wt.% and $\leq 15$ wt.% of dry matter into a gel-like state, with the polymer being in the form of a crosslinked three-dimensional reticulum, within a specified period of time at a constant temperature, then compounds of tetravalent titanium display the highest crosslinking activity. All the other known inorganic crosslinking agents, including compounds of trivalent boron and tetravalent zirconium and hafnium, as well as their compounds with titanium, show much lower crosslinking activity. This is associated with the fact that in the titanium Subgroup of Group IV of the Periodic System, titanium itself has the minimum ionic radius and, hence, maximum surface potential, governing maximum rate of chemical reactions. As compared to trivalent boron, tetravalent titanium has a higher charge and greater coordination number (4 for boron and 6 for titanium); therefore, titanium is a more active complexing agent than boron (chelate compounds are of intracomplex nature). Though the crosslinking activity of tetravalent titanium compounds is high, they are not the only inorganic crosslinking agents for hydroxyl-containing water-soluble polymers. This is, first of all, associated with the fact that the crosslinking activity of tetravalent titanium compounds is so high, that introduction of these compounds into an aqueous solution of hydroxyl-containing polymers, e.g. into a polyvinyl alchohol solution, with the polymer concentration over 3%, causes a rapid (taking as little as a few seconds) formation of the crosslinked polymer gel, after which the crosslinked polymer becomes unfit for use and transportation.

At present three ways of using tetravalent titanium for crosslinking aqueous solutions of polymers are known, yet none of them gives all the advantages stemming from the high crosslinking activity of tetravalent titanium.

The first way consists in reducing the crosslinking activity of tetravalent titanium compounds by combining them with other inorganic crosslinking agents, mainly with trivalent boron compounds. This method does not present any particular interest, since, being of palliative character, it does not eliminate the above-said disadvantages (formation of the polymer gel), but only defers the occurrence of the unfavourable pehnomena by reducing the crosslinking activity.

The second way, as known in the art, consists in the use of trivalent titanium compounds introduced into an aqueous solution of the polymer to be crosslinked together with an oxidant, which, after a period of time ranging from several minutes to a few dozens of minutes, oxidizes titanium to its tetravalent state the only state in which titanium crosslinking activity manifests itself. It should be noted, that the proportioning of the oxidant and the method of introducing it into the solution will govern the crosslinking process rate to no smaller extent than the concentration of titanium ions, i.e. instead of one crosslinking process parameter (titanium concentration) two parameters must be strictly controlled, so that carrying out the crosslinking becomes substantially more complicated. Moreover, any casual delay in the use of the prepared composition containing an aqueous solution of the polymer to be crosslinked, trivalent titanium and an oxidant will also lead at best, to the deterioration of the composition because of gel formation.

Both of the above-considered ways have one common substantial process disadvantage: after the polymer solution has been combined with the crosslinking agent the storage time of the prepared composition is determined only by kinetic factors, whereas chemical reactions leading to crosslinking commence immediately or/almost immediately after the components have veen combined and proceed with an equal rate until crosslinking is completed. Usually the storage time of the composition prepared for use amounts to a few minutes.

The third, most extensively used way consists in that the process of applying an aqueous solution of a polymer and the process of chemical crosslinking of the polymer by compounds of tetravalent titanium are carried out in two separate stages; this makes the entire process more complicated, increases its duration and requires additional costly equipment. This way is disclosed in U.S. Pat. No. 3,679,544, Cl. 162-157R. This Patent relates to producing waterresistant paper or nonwoven materials, and more particularly, to producing paper or nonwoven materials displaying resistance to water, especially to warm and hot water; in addition such paper possesses low moisture adsorption capacity and adequate resistance to washing; initial fibers of this paper or nonwovens are bonded together by means of a binder such as water-soluble polyvinyl alcohol fibers or polyvinyl alcohol resin with a dissolving point equal to 95° C. Paper or nonwoven materials which consist completely or partially of polyvinyl alcohol are treated at about 40° C. or lower with an aqueous solution of α-titanic acid containing at least 0.2 wt.% of metallic titanium, then washed and dried. In said U.S. Patent it has been revealed that water resistance, particularly to hot water, low moisture adsorption capacity and adequate washing resistance of polyvinyl alchohol paper and of nonwoven materials containing polyvinyl alcohol with dissolving point of 95° C. or lower can be substantially improved by treating these materials at a temperature below 40° C. with a solution produced by adding titanium tetrachloride to water at a temperature below 40° C., or with a solution in a mineral acid of a residue produced by adding titanium tetrachloride to water, followed by the addition of ammonia. It has been further revealed that said treatment solution is unstable during storage, and that it can be stabilized by bringing it up to specific titanium: mineral acid concentration ratio or by producing a solution of titanium in a mineral acid having a concentration not below 40%, followed by addition of an alcohol.

In essence, said Patent relates to a method for producing a crosslinking agent based on a tetravalent titanium compound (α-titanic acid) to a method of stabilizing such compound, and to its application for crosslinking of polyvinyl alcohol.

The method of preparing the crosslinking agent, as disclosed in said U.S. Patent, resides in the following. Titanium tetrachloride is added to water at a temperature of 40° C. and below. At a higher temperature a residue is formed, making the crosslinking agent unsuitable for treating paper or a nonwoven material according to the method described. Hydrolysis of titanium tetrachloride gives an aqueous solution containing approximately 15 wt.% titanium and 35-40% HCl, which for direct use is diluted in water to a concentration of titanium of 0.2-5.0 wt.%, usually to 0.5-2.0 wt.% to the weight of solution. With titanium concentration below 0.2 wt.% the desired water-resistance effect cannot be attained within the framework of the described method. With titanium concentration above 5 wt.% HCl concentration becomes equal to 14 wt.% and over, and a strongly acidic medium causes destruction of paper and nonwoven material.

The second embodiment of the method for preparing the same crosslinking agent which is a solution of α-titanic acid, resides in the following:

Titanium tetrachloride is added to water, then ammonia is introduced thereinto, the resultant precipitate of α-titanic acid is filtered and dissolved in mineral acids, for example, hydrochloric, sulfuric, nitric or orthophosphoric. This solution can be prepared with titanium concentration of about 15 wt.% and with the mineral acid concentration ranging from 35 to 40 wt.%. Hydrochloric acid solution is diluted prior to its use in the same manner as in the first embodiment. When using sulphuric acid, the solution is diluted to the titanium concentration of 0.2-5.0 wt.%, preferably 0.5-2.0 wt.%, and to the sulphuric acid concentration from 0.7 wt.% and over, preferably from 1.8 to 7.2 wt.%.

The treating solutions are relatively stable during storage, provided that titanium concentration amounts to 5% and over. When the solution is diluted to working concentrations of titanium (0.5 to 2.0 wt.%), a white precipitate of α-titanic acid is formed the content of this acid in the dissolved form diminishes and the solution loses its crosslinking capacity for polyvinyl alcohol.

In accordance with the cited U.S. Patent, stabilization of the crosslinking agent against precipitation of the α-titanic acid is accomplished by introducing a monohydric or polyhydric alcohol into the concentrated or working solution of the crosslinking agent.

As a stabilizing alcohol it is possible to use an aqueous solution of polyvinyl alcohol with a concentration below 3 wt.%, preferably 0.01-2.0 wt.% of the solution; titanium concentration in the solution to be stabilized should not in excess of 5 wt.%, preferably from 0.5 to 3.0 wt.%, and said polyvinyl alchohol solution and the crosslinking agent solution should be combined with sufficient care, since in case the polyvinyl alcohol solution, even diluted to the above-specified limits, is added rapidly, a hard-to-removed gel immediately forms on the surface of the equipment. If other alcohols are employed, they are introduced into solutions of the crosslinking agent in an amount of 40 to 95 wt.% so that after diluting these alcohols to the working concentrations of titanium (0.5–2.0 wt.%) the amount of the alcohol in the solution should be 1–10 wt.%, preferably 2–7% of the weight of solution.

In accordance with the cited U.S. Patent, the use of the crosslinking agent presupposes two technological operations: (a) introduction of polyvinyl alcohol in the form of fibers, as a powder or as an impregnating solution; (b) crosslinking the polyvinyl alcohol by impregnating a fabricated article (paper or a nonwoven material) with the above-described crosslinking agent solution. While in the case of introducing the polyvinyl alcohol binder the two-stage nature of the process is evident: impregnation with polyvinyl alchohol solution — drying — impregnation with the crosslinking solution — drying, in the case of using polyvinyl alcohol fibers the double-stage nature of the process resides in that the first stage consists in shaping polyvinyl alcohol fibers on special equipment and involving problems of its own, while the second stage: impregnation with the crosslinking agent solution — washing — drying is carried out in the course of fabricating the moisture-resistant material.

Finally, when using a polyvinyl alcohol powder, the double-stage character of the process is even less evident. However, introduction of the polyvinyl alcohol powder into the rollers, refiners and the like equipment can be only considered as a version of the impregnation procedure, during which the binder introduction stage is combined with the stage of preparing the fibrous mass. This version has obvious disadvantages consisting in higher consumption of polyvinyl alcohol which is more expensive than cellulose, as compared with the version when polyvinyl alcohol is introduced into paper or into the nonwoven material only as an impregnating solution. The second essential disadvantage consists in low efficiency of polyvinyl alcohol as a binder when it is introduced as a powder at the material shaping stage.

The cited U.S. Patent teaches additional impregnation with a polyvinyl alcohol solution and subsequent drying to be used when producing paper from cellulose fibers bonded with polyvinyl alcohol in the disclosed manner.

Particular disadvantages of the method as disclosed in the cited U.S. Patent are as follows:

(a) the crosslinking agent; i.e. aqueous solution of $\alpha$-titanic acid, is unstable under conditions of temperature increase and dilution to working concentrations of titanium. In the Patent under consideration lability is overcome by special introduction of a strong acid and or by adding a specific stabilizer, viz., a mono- or polyhydric alchohol, particularly, polyvinyl alcohol. These both ways as such constitute disadvantages of the crosslinking agent: the acidic medium promotes corrosion of equipment and necessitates the use of acid-resistant materials, while stabilization with alcohols is an additional operation in preparing the crosslinking agent and calls for additional consumption of chemicals (alcohols) which do not participate directly in the crosslinking reactions of the binder.

(b) The method of preparing the crosslinking agent requires control over the temperature of hydrolytic decomposition of titanium tetrachloride and presents certain difficulties in stabilizing the crosslinking agent with polyvinyl alcohols solution, since a slight increase in the rate of proportioning polyvinyl alcohols solution leads to the formation of a hard-to-remove gel on the equipment working surfaces, while the use of monohydric alcohols for stabilization requires the observance of safety rules prescribed for working with toxic organic solvents.

(c) When producing articles (paper or nonwoven materials) with the use of $\alpha$-titanic acid solution as the crosslinking agent, the processes of applying the binder and of carrying out the crosslinking of the binder are conducted separately in two stages, or in the case of using polyvinyl alcohol binder in the form of a powder, when the stage of introducing the binder is combined with the stage of preparing a fibrous mass for shaping a web, higher consumption of polyvinyl alcohol is required, this being economically inexpedient and technically inefficient. There are still another two negative factors associated with the use of said crosslinking agent for impregnating paper or a nonwoven material. One of these disadvantages is the lengthy stage of impregnating with the crosslinking agent. In accordance with the description, the impregnation process lasts for at least 1 min. This signifies that if it is desirable to treat paper with said crosslinking agent directly on a papermaking machine operating even at such low rates as 60 to 100 m/min., it will be necessary to build-in an impregnation bath from an acid-resistant material with the length of the paper run in the impregnating solution of at least 60 to 100 m. Taking into account difficulites of paper threading in an aggressive (acidic) medium, it is apparent that attempts to combine the crosslinking technology under consideration in one unit with the existing papermaking process will be unrealistic.

The second disadvantage resides in the necessity of washing the paper or nonwoven material after treating thereof with the crosslinking agent, since the acid contained in the latter causes destruction of the paper and nonwoven material. The duration of washing is not indicated in the description, but the necessity in an additional operation comparable in duration with that of impregnation with the crosslinking agent is evident.

SUMMARY OF THE INVENTION

The principal object of the present invention is to provide a crosslinking agent composition for chemical treatment of hydroxyl-containing water-soluble polymers, such as will permit carrying out a double-stage physico-chemical process of producing a chemically crosslinked article from a soluble polymer in one technological state.

Another object of the present invention is to provide a method for producing such an agent which could be used to particular advantage for making various grades of paper. Still another object of the present invention is to provide a crosslinking agent resistant to temperature increase during the polymer crosslinking as well as to dilution without recourse to special stabilizers.

It is also an object of the present invention to reduce the polymer consumption.

Yet another object of the present invention is to provide such a coating for various grades of paper, which could increase mechanical strength of the latter and would contribute to reducing penetration of water and organic solvents through paper.

Still another object of the present invention is to improve the quality of the target product.

These and other objects are accomplished by a crosslinking agent for chemical treatment of hydroxyl-containing water-soluble polymers which is based on a substance capable of forming crosslinks with said polymers, in accordance with the invention, comprises grains, and which each such grain having a nucleus of a substance inert to said substance forming crosslinks with said polymers, and an external layer surrounding this nucleus and containing compounds of tetravalent metals selected from the group consisting of titanium, zirconium, hafnium and tin.

The object is also accomplished by a method for producing the crosslinking agent in the form of grains, for the chemical treatment of hydroxyl-containing water soluble-polymers, according to the invention, comprising applying to inert fine-dispersed particles a substance capable of forming crosslinks with said hydroxyl-containing water-soluble polymers, and subjecting said substance to hydrolytic treatment for forming an external layer of the grain.

Said object is also accomplished by a pressure of paper with a fibrous base; in accordance with the invention, comprising applying a coating to the base, which contains hydroxyl-containing water-soluble polymers treated with the crosslinking agent in the form of grains, each grain having a nucleus of a substance inert to the substance capable of forming crosslinks with said polymers, and an external layer surrounding this nucleus and containing compounds of tetravalent metals selected from the group consisting of titanium, zirconium, hafnium and tin.

DESCRIPTION OF THE INVENTION

It is advisable that the size of the nuclei in the grains not exceed 30 microns, since with a bigger nucleus size the crosslinking agent has an insufficient specific surface, and the efficiency of its activity diminishes.

The mass of the external layer should constitute from to 0.1 to 4.0% of that of the nucleus, since the crosslinking agent will not display sufficient crosslinking activity with the mass of the external layer below that specified herein. With the mass of the external layer above 4.0%, the destructive effect of the acidic products of hydrolysis of the external layer material on the paper the paper will become pronounced.

When realizing the method of preparing the crosslinking agent, it is advisable that the substance capable of forming crosslinks with hydroxyl-containing water-soluble polymers be applied on the nucleus surface either in its initial form or in the form of solution.

As a substance capable of forming crosslinks titanium tetrachloride can be used.

The grain nuclei can consist of blanc fixe, kaolin, titanium dioxide and carbon black particles, taken either separately or in combination.

Finely dispersed particles constituting the nuclei can be used in the form of a dry powder or a paste.

Another embodiment of the invention resides in using a photographic paper base as a fibrous base for paper.

It is advisable that as hydroxyl-containing water-soluble polymers polyvinyl alcohol, or gelatin, or starch should be used.

The essence of the present invention consists in the following.

Solutions of a crosslinking agent, such as of α-titanic acid, with a molecular degree of dispersity, whose instability has to be overcome by using special techniques, are supplanted by dispersions containing α-titanic acid on the external surface of the particles. Such grains consisting of an inert nucleus and an external layer retain dispersibility of the initial inert particles, e.g. of pigment particles, and crosslinking activity of α-titanic acid solutions. The nucleus of the dispersion grains is an inert carrier of the chemically active substance of the external layer, which contributes to uniform distribution of the chemically active substance within the solution volume of the polymer to be crosslinked. Since strong acids, such as hydrochloric acid, evolve during the hydrolysis of compounds which function as inorganic crosslinking agents of water-soluble hydroxyl-containing polymers, the application of certain pigments, calcium and barium carbonates, for example, presents difficulties, insofar as strong acids cause their destruction. Therefore, the only requirement to the material of the carrier nuclei is its being inert to the substance of the external layer, since, with this condition fulfilled, inertness to the aqueous solution of polymers is also attained.

It is evident, that the majority of pigments used in papermaking meet the inertness requirement, since the most extensively used pulp preparation method requires the use of an acidic medium. We have specially selected pigments most frequently included into the paper coating compositions: kaolin, blanc fixe, titanium dioxide and carbon black. Other pigments, however, such as aerosil, talc or asbestos, are also quite suitable as the material for the nucleus of the crosslinking agent.

As regards the dispersity degree of the pigments used as nuclei, the dispersity of the majority of commercially available pigments, i.e. with the maximum sizes of particles ranging from 8 to 10 microns, is quite sufficient. If the sizes of the particles constituting the nuclei of the crosslinking agent exceed 30 microns, the crosslinking activity decreases, apparently because of a decrease in the reactive surface area. A facultative requirement to be met by the crosslinking agent nuclei is the correspondence of the crosslinking agent nucleus diameter to the layer thickness of the composition, crosslinked by this agent, which layer is formed after the composition containing a water-soluble polymer crosslinked by said agent has been applied on the paper surface and dried.

In many cases paper is treated with pigment-containing coatings, for example, in white pigment coating or baryta coating of paper. Complete or partial replacement of pigment particles by the crosslinking agent distinguished by the presence of an external chemically active layer will not bring about any substantial changes in the coating application technique, yet it will markedly improve the physico-mechanical properties of the coatings. Neither does the use of the given crosslinking agent require changes in the process technology or equipment in the case of applying coatings directly on papermaking machines, for instance on size presses. The crosslinking agent, in addition to its main function of crosslinking the polymeric binder of the sizing composition for the surface treatment of paper, also serves as an active filler reinforcing the polymer composition. The amount of the crosslinking agent in relation to the polymer to be crosslinked depends on the mass of the external layer of the grains, on the dispersity degree of the crosslinking agent nuclei, on the kind of the crosslinking substance constituting the external layer, on the kind of the polymer to be crosslinked, and on the desired degree of crosslinking.

If the mass of the external layer of the grains is less than 0.1% of the nucleus mass, even the use of the most active crosslinking agent such as α-titanic acid does not give any appreciable effect of the polymer chemical crosslinking. If the mass of the external layer exceeds 4.0% of the nucleus mass harmful effect of the acidic products of hydrolysis starts to tell on the strength of paper or a nonwoven material made with the use of the given crosslinking agent. It is most advisable to use α-titanic acid as the external layer material of the grains of the crosslinking agent produced through hydrolysis of suitable compounds of tetravalent titanium, zirconium, hafnium and tin, taken either separately or in combination, since in view of the above considered reasons it is obvious that tetravalent titanium compounds are most active for chemical crosslinking of hydroxyl-containing polymers in an aqueous solution. This statement, however, does not rule out the possibility of applying an external layer of hydrolyzed compounds of other known substances used for the chemical crosslinking of hydroxyl-containing water-soluble polymers.

The crosslinking agent is prepared by applying a compound to be hydrolyzed, which is capable of chemically crosslinking water-soluble hydroxyl-containing polymers, on inert finely dispersed particles, e.g. of pigments, this compound, upon hydrolysis, forming an external layer of the crosslinking agent grains. Titanium tetrachloride in this case proves to be most suitable as the substance to constitute the external layer and to be then hydrolyzed, since under normal conditions at room temperature, titanium tetrachloride is a mobile liquid readily distributable over the surface of the inert nuclei. Tin tetrachloride is also a liquid, but the crosslinking effect of tin tetrachloride to water-soluble polymers is weaker than that of titanium tetrachloride. α-Titanic acid which is formed during hydrolysis of titanium tetrachloride according to the reaction $TiCl_4 + 3H_2O = H_2TiO_3 + 4HCl$ settles on the surface of the nuclei and is capable of entering into reactions involving the formation of chemical crosslinks between the polymer macromolecules. When using hydrolyzable compounds as the crosslinking agents in solid state, for a better distribution of the external layer substance over the surface of the nuclei, it is possible to employ solutions of these solid compounds in a suitable solvent, e.g. in concentration solutions of mineral acids. In this case hydrolytic treatment of the substance forming the external layer can be combined with partial neutralization of acids with aqueous solutions of alkalies or ammonia.

Pigment particles serving as the nuclei of the crosslinking agent can be used in the form of dry powder. In this case the very substance constituting the external layer of the crosslinking agent or a solution of this substance, is applied on the surface of the nuclei, for example, by impregnating this powder. Then to the powder treated, e.g. by impregnation, water or an alkali aqueous solution is added under stirring until a cream-consistency paste containing particles of the crosslinking agent is obtained. The amount of water to be added depends upon the kind of pigment taken as the crosslinking agent nuclei, on the degree of its dispersity and on the dryness of the initial powder. Usually the quantity of water added to the powder is such that the concentration of dry matter in the resultant paste should be 25 to 75%, preferably about 50%. Under the above-specified conditions, when the paste is subjected to neither special heating nor cooling, the substance applied on the surface of the nuclei, e.g. titanium tetrachloride undergoes hydrolysis and an external layer is formed on the grains, which is capable of forming chemical bonds between the polymer macromolecules. When compounds of tetravalent titanium, zirconium, hafnium or tin are used as the substance forming the external layer, the hydrolysis gives respective acids, e.g. α-titanic or α-stannic acid.

In the case when pigment particles serving as the crosslinking agent nuclei are used in the form of paste, the dry matter concentration in it is brought to 25 to 75%, preferably to about 50% by adding water or an aqueous alkaline solution. Then, the very substance which forms the external layer on the grains of the crosslinking agent or a solution of this substance is then added to the paste under stirring. In this case hydrolytic treatment of the substance which forms the external layer of the crosslinking agent grains proceeds simultaneously with the application of the external layer. We have established that realization of the both above-considered embodiments of the method for producing the crosslinking agent results, with all other conditions being equal, in identical products having the same reactivity.

The crosslinking agent can be produced by this method in any vessel made of an acid-resistant material and equipped with a stirrer and a lid. No special equipment is required for producing the crosslinking agent. The storage life of the water paste prepared from the finished crosslinking agent and stored in a hermetically sealed acid-resistant container is sufficiently long and amounts to at least 6 months without deterioration of the paste crosslinking activity.

The prepared crosslinking agent can be dried and stored in its dry state; however, in such a case before using the crosslinking agent it should be redispersed in water.

The method of preparing the crosslinking agent will remain the same irrespective of the kind of pigments whose particles are employed as inert nuclei of the crosslinking agent: blanc fixe, kaolin, titanium dioxide or carbon black, taken separately or in combination.

Paper made by conventional methods on conventional papermaking machines is coated with a coating consisting of hydroxy-containing polymers treated in an aqueous solution with the crosslinking agent prepared as stated above. In addition to the water-soluble polymers treated with the crosslinking agent the coating can contain dispersions of organic substances, for example, latexes or dispersions of waxes, pigment particles without the external layer of the substance capable of forming chemical crosslinks, particles of optical brightening agents, plasticizers, stabilizers, dyes and other similar known coating components compatible with the polymer treated with said crosslinking agent.

The coatings can be applied on the paper surface on the papermaking machine, on size presses, in doctor or roller assemblies, or by spraying. In all cases the coatings can be applied in one unit and in one technological stage. Liquid dispersions containing an aqueous solution of the hydroxyl-containing polymer, treated with the crosslinking agent, can be stored at room temperature of 20° ± 5° C. under conditions precluding evaporation for a period of at least 30 days without an appreciable increase in viscosity. After applying said surface coating on paper and drying the coating for a period of time not exceeding 1 minute with the paper travelling speed not below 60 m/min. and the temperature of the drying cylinders of about 100° C., the paper with this coating acquires high resistance to water penetration expressed in longer time required for the passage of water and aqueous solutions through the coated sheet of paper (soaking time) and in a reduction of the paper surface absorption capacity when wetting one side of the paper sheet with water or aqueous solutions as compared with paper coated with a water-soluble hydroxyl-containing polymer not treated with the crosslinking agent. The coating itself, containing the water-soluble hydroxyl-containing polymer treated with the crosslinking agent loses its water solubility after drying and practically does not swell in it, this being indicative of the far advanced process of forming chemical crosslinks between the polymer macromolecules.

The coatings can also be applied outside the papermaking machine, on special devices, such as white pigment coating units or baryta coating machines. In this case the double-stage process of producing the coating (coating formation with a soluble polymer and crosslinking of this polymer before its transition into an insoluble state) can also be carried out in one technological stage and in one unit owing to the possibility of safe blending of the aqueous solution of the polymer with the crosslinking agent as regards gel formation.

The coatings thus formed are not only resistance to penetration of water and aqueous solutions, but also have a highly hydrophilic surface. Thus, the contact angle of wetting the coating surface on paper with water does not exceed 70°–80° (depending on hydrophobic nature of the paper surface without the coating, the contact wetting angle of which amounts to 100°–110° respectively). It should be noted that the hydrophilic nature of the surface with the use of the crosslinking agent increases to a greater extent than with applying the coating from the same hydroxyl-containing polymer not treated with the crosslinking agent. This is explained by the fact that the crosslinking agent particles at the interface with air have a much higher surface tension (usually over 1,000 dyne/cm) than the layer of the hydroxyl-containing water-soluble polymer, the surface tension of which at the interface with air is usually 50 to 50 dyne/cm. Therefore, with an equal layer thickness of the surface coating (about 1 micron) on a hydrophobic paper base the hydrophilic hydroxyl-containing polymer assures the reduction of the paper surface contact wetting angle with water by 15° to 20°, whereas the same polymer crosslinked by the herein-proposed method assures the reduction by 25° to 30°.

Selection of the material for the nuclei of the crosslinking agent is governed first of all by the grade of paper and by the type of the coating applied thereon. Thus, for the majority of grades of art paper kaolin is used as the white pigment. In this case, for obtaining crosslinked white pigment coatings, it is expedient to use the crosslinking agent with a nucleus from kaolin. To produce coatings with a high covering power and high degree of whiteness for high-quality grades of paper, titanium dioxide is used as the pigment. For crosslinking the polymer in such coatings, it is possible to use the crosslinking agent with nuclei constituted by particles of titanium dioxide.

For making lightproof coatings on paper carbon black is used; the crosslinking agent with the nuclei consisting of carbon black particles can be used for the polymer crosslinking in these coatings.

For baryta coating of the photographic paper base blanc fixe (precipitated barium sulfate) is employed. For rendering the baryta-coated base of the photographic paper water-proof, it is expedient to crosslink the polymer in the baryta layer with the crosslinking agent whose nuclei consist of blanc fixe particles.

Surface sizing of the photographic paper base on the papermaking machine with a composition containing the crosslinking agent with the nuclei consisting of blanc fixe particles and a hydroxyl-containing water-soluble polymer, e.g. polyvinyl alcohol, not only increases the paper soaking time and decreases its absorption capacity, but can also replace, partically or completely, baryta coating of paper. Since baryta coating of the photographic paper base is normally carried out by passing it twice through the baryta coating machine with the speeds much lower than that of the papermaking machines on which the photographic paper base is produced, the replacement of the first baryta coating stage alone by the surface sizing on the papermaking machine gives a substantial economic effect. We have established that the surface sizing of the photographic paper base in one horizontal size press of the papermaking machine, using the composition containing polyvinyl alcohol crosslinked with the aid of the crosslinking agent having blanc fixe nuclei and an external layer consisting of α-titanic acid, when applying the sizing composition on the paper surface in the amount of approximately 3 g/m$^2$, permits the obtaining of a technical grade photographic paper base whose quality is comparable with the twice baryta-coated photographic paper base. It should be noted, that the application of the same sizing composition in the amount of 8 to 10 g per m$^2$ of paper, carried out by passing the paper through two or three size presses permits the obtaining of paper comparable, as regards water penetration resistance, to the paper coated with extruded a polyolefin coatings.

The use of surface sizing of paper with the composition containing the crosslinking agent, e.g. such as described above, will permit the making of paper on the existing equipment, without extra capital investments and without reducing the efficiency of the papermaking machine, this paper being competitive with paper having a polyolefin coating. So far as we know coatings of the photographic paper base, containing polyvinyl alcohol treated with the above-described crosslinking agent are photographically inert and do not cause fogging of the photographic paper.

Starch, gelatin and polyvinyl alcohol should be particularly cited as representatives of hydroxyl-containing water-soluble polymers used for coating the paper, specifically suitable for treatment with the crosslinking agent in view of the following reasons: starch is most extensively used in various coatings applied on paper for creating a hydrophilic surface resistant to water penetration. Crosslinking of starch and its numerous modified derivatives with the crosslinking agent will make possible a drastic improvement in said desirable properties of the coatings. Gelatin is traditionally extensively used for coating the photographic paper base on papermaking and baryta coating machines. Treating of gelatin with the crosslinking agent bearings about an appreciable improvement in the quality of the coatings, namely, an increase of the paper soaking time and to a decrease in its surface absorption. Polyvinyl alcohol is the best film-forming polymer among the known film-forming water-soluble hydroxyl-containing polymers known in the art. It successfully replaces other water-soluble polymers and forms, under the same conditions, higher-quality coatings. Polyvinyl alcohol solutions retain fludity sufficient for further use, with the polymer concentration of 15 to 16% by weight of the solution. Treatment of polyvinyl alcohol with the crosslinking agent makes such coatings completely insoluble and resistant to water penetration.

It should be noted, that separation of polyvinyl alcohol, starch and gelatin into a special group does not mean that the crosslinking agent is unsuitable for other water-soluble hydroxyl-containing polymers.

The use of the crosslinking agent for treating hydroxyl-containing water-soluble polymers also reduces the polymer consumption with the same amount of layer applied, as compared with the untreated polymer.

Coatings treated with the crosslinking agent increase the mechanical strength of paper and contribute to a decrease in penetration of oils organic solvents through paper. Specific examples of realizing the present invention are given hereinbelow by way of illustration.

EXAMPLE 1

In this Example realization of the herein-proposed invention will be described with respect to the process of preparing the crosslinking agent for the chemical treatment of polyvinyl alcohol aqueous solution. Blanc fixe with the maximum size of particles of up to 8.5 microns in the form of a water paste with dry matter content of 60% was taken as the material for inert nuclei of the crosslinking agent.

Titanium tetrachloride in the amount of 1.6% of the mass of absolutely dry blanc fixe was taken as the substance forming the external layer of the grains.

The crosslinking agent was prepared in the following manner.

The blanc fixe paste was diluted with water to cream consistency under continuous stirring. Blanc fixe content in the paste was 45 to 50%. Then the required amount of titanium tetrachloride was poured under stirring into a vessel containing the diluted blanc fixe paste; thereby titanium tetrachloride was caused to undergo hydrolytic decomposition, while α-titanic acid, formed during the hydrolysis, settled on the surface of the blanc fixe particles as an external layer on the grains. After hydrogen chloride gas ceased to evolve, the crosslinking agent was ready for use. The crosslinking agent thus prepared was mixed with a solution of polyvinyl alcohol, having a dry matter concentration of 15%, polyvinyl alcohol saponification degree over 90% and with a molecular weight of 1,500 in such a manner that the mass of the dry matter of the crosslinking agent was equal to the mass of dry polyvinyl alcohol, while the dry matter concentration in the prepared sizing dispersion was equal to 14 to 15%. This dispersion was divided into two equal parts, one of which was applied using rubber rolls; the photographic paper base was prepared in the following manner. Softwood sulfite, bleached and refined pulp and aspen sulfate bleached pulp were separately ground in beaters down to freeness of 32–35 Schopper-Riegler degrees (SR) and down to the mean weight value of the fiber length of 5.6 g and down to 50–55 Schopper-Riegler degrees (° SR) and to 1.2 g of the fiber length mean weight value respectively; then on the basis of these pulps a composition was prepared, containing 75% of absolutely dry softwood pulp and 25% of absolutely dry aspen pulp in the form of an aqueous suspension with the concentration of dry matter of 2%. This composition was treated with chemicals, their type, sequence of introducing and amounts being set forth below.

(1) Optically brightening agent Weiβtoner produced in DDR — 0.2% of the mass of absolutely dry pulp.
(2) White colophony adhesive — 1.4% of the mass of absolutely dry pulp.
(3) Ammonium alum — 6.0 (to pH of the paper pulp equal to 4.5) of the mass of absolutely dry pulp.
(4) Blanc fixe (barium sulfate for baryta coating of papers) — 6.0% of the mass of absolutely dry pulp.
(5) Melamine-formaldehyde resin (1.5% hydrochloric acid solution) — 1.5% of the weight of absolutely dry pulp.

Thus prepared paper pulp was cast on a Fourdrinier machine with the forming rate of 60 m/min. and trimed width of 940 mm. After the pulp dehydration on the wire, the resultant web was pressed, dried and calendered, giving a photographic paper base with 1 $m^2$ mass equal to 135 g and the following physico-mechanical properties: breaking length — 2,410 m; rupture — 100 double bends; wet strength 18% after staying for 120 min. in water; soaking time in 10% aqueous $Na_2CO_3$ solution — 19 min; absorption capacity for the same solution with one-sided wetting for 180 sec. — 33 g/$m^2$.

After the application of the above-described dispersion, containing the crosslinking agent, on the paper surface drying the treated paper in air and final drying at 100° C. for 1 min., the coated paper had the following characteristics:

breaking length — 2,820 m;
rupture — 343 double bends;
wet strength — 24% after staying for 120 min. in water;
soaking time in 10% $Na_2CO_3$ solution — 43 min;
absorption capacity for the same solution with one-sided wetting for 180 sec. — 19 g/$m^2$.

The second part of the prepared dispersion was stored during 30 days at room temperature of 20° ± 5° C. in a hermetically sealed jar. After that the settled crosslinking agent was stirred with the remaining volume of dispersion and said dispersion was applied on the same paper with the same rubber rolls. Coated paper was thus produced.

In the both cases the amount of the coating applied was approximately 4 g per $m^2$ of paper; physico-mechanical characteristics of the paper coated with the dispersion stored for 30 days were the same as those of the paper coated with the freshly prepared dispersion.

As can be seen from this Example, the sizing dispersion, containing the crosslinking agent, can be stored for 30 days without changing its properties. The paper sized on the surface with this dispersion is noticeably superior in its mechanical characteristics, breaking length, rupture and wet strength to the paper without the surface coating containing the crosslinking agent. Resistance to penetration of water and aqueous solutions also increases substantially.

EXAMPLE 2

This Example illustrates realization of the present invention for the process of preparing the crosslinking agent with the external grain layer consisting of α-zirconic acid. Blanc fixe in the form of dry powder with the dispersion degree as in Example 1 was used as the inert nuclei of the crosslinking agent. Zirconium tetrachloride as 5% solution in 20% hydrochloric acid solution was used as the substance forming the external layer. Zirconium tetrachloride was taken in such an amount that the mass of ions of tetravalent zirconium in the external layer amounted to 3% of the mass of the nuclei. After the blanc fixe had been impregnated with said zirconium tetrachloride solution, the mixture was partially neutralized with a 10% aqueous ammonium solution to pH = 5, and the forming crosslinking agent was further diluted with water down to 45% dry matter concentration in the crosslinking agent paste.

Sizing dispersion was then prepared as in Example 1, and in the same manner as in the preceding Example, it was applied on paper described above. The resulting coated paper had the following physico-chemical characteristics:
  breaking length — 2,630 m;
  rupture — 310 double bends;
  wet strength — 19% after staying for 120 min. in water;
  soaking time in 10% $Na_2CO_3$ solution — 27 min;
  absorption capacity for the same solution with one-sided wetting for 180 sec. — 26 g/m².

The amount of the sizing composition applied was equal to 4 g/m² as in Example 1.

As can be seen from this Example, paper with a coating crosslinked with α-zirconic acid excels in quality compared to the paper without the surface coating as in Example 1.

EXAMPLE 3

Realization of the present invention will now be described for the process of preparing the crosslinking agent with the external grain layer consisting of hydrolysis products of a tetravalent hafnium compound.

Blanc fixe in the form of a water paste as in Example 1 was used as a substance for the inert nuclei of the crosslinking agent.

Hafnium oxychloride in the form of a 9% solution in 15% hydrochloric acid solution was used in the external layer forming substance. Hafnium oxychloride was taken in such an amount that the mass of ions of tetravalent hafnium in the external layer amounted to 3% of the nucleus mass.

After mixing said hafnium oxychloride solution with the blanc fixe paste, the mixture was partially neutralized with a 10% aqueous solution of sodium hydroxide to about pH = 6, and the forming crosslinking agent was further diluted with water to about 25% dry matter concentration in the crosslinking agent paste. A sizing dispersion was then prepared and applied on the paper surface as in Example 1. The same grade of paper was used as in said Example 1.

The resulting coated paper had the following physico-chemical characteristics when the sizing composition in the amount of about 4 g per m² of paper:
  breaking length — 2,700 m;
  rupture — 364 double bends;
  wet strength — 19% after staying for 120 min. in water;
  soaking time in 10% $Na_2CO_3$ solution — 24 min;
  absorption capacity for the same solution with one-sided wetting for 180 sec. — 28 g/min.

As can be seen from this Example, the coating containing the crosslinking agent with a external layer derived from tetravalent hafnium when applied on paper, enhances mechanical strength and waterproofness thereof.

EXAMPLE 4

In this Example realization of present invention will be described for the process of preparing the crosslinking agent with the external layer of the grain consisting of α - stannic acid. As in Example 2, blanc fixe was used as the substance for the inert nuclei of the crosslinking agent. Tin tetrachloride was used as the substance for forming the external layer. The blanc fixe powder was impregnated with tin tetrachloride so that the content of tetravalent tin in the external layer of the crosslinking agent was equal to 2.5% of the nucleus mass.

After the mixture had been partially neutralized with a 10% aqueous solution of ammonia to a pH of about 5, the suspension of the formed crosslinking agent was further diluted to a concentration of dry matter equal to 60%. Then paper was taken, as in Example 1 sizing composition was prepared and applied on this paper surface.

When about 4 g of the dry matter of the sizing composition was applied per 1 m² of the paper surface, the resulting coated paper had the following physico-mechanical characteristics:
  breaking length — 2,660 m;
  rupture — 325 double bends;
  wet strength — 20% after staying for 120 min. in water;
  soaking time in 10% $Na_2CO_3$ solution — 30 min;
  absorption capacity for the same solution with one-sided wetting for 180 sec. — 22 g/m².

The given Example is indicative of high quality of paper with a coating containing the crosslinking agent with an external layer consisting of α - stannic acid.

EXAMPLE 5

This Example illustrates realization of the present invention for the process of preparing the crosslinking agent as in Example 1, the difference being that titanium tetrachloride was taken in such in such an amount that the mass of ions of tetravalent titanium in the external layer of the crosslinking grains amounted to 0.1% of the mass of the nuclei. After a sizing dispersion containing the crosslinking agent with 0.1% tetravalent titanium ions in the external layer had been prepared as in Example 1, the same paper was used with the same surface coating application procedure as in Example 1

At the same time a coating of a pure polyvinyl alcohol solution with 14 to 15% polymer concentration of the solution mass was applied on paper as in Example 1.

Paper with a coating containing the crosslinking agent and paper with a coating consisting of untreated pure polyvinyl alcohol were thus obtained, with the same amount of the sizing compound applied in both cases, of about 4 g per m².

Paper with the crosslinking agent contained in the coating had the following physico-mechanical characteristics:
  breaking length — 2,650 m;
  rupture — 297 double bends;
  wet strength — 19% after staying for 120 min. in water;
  soaking time in 10% $Na_2CO$ solution- 23 min.;
  absorption capacity for the same solution with one sided wetting for 180 sec. — 30 g/m².

Paper with a coating consisting of untreated polyvinyl alcohol thus obtained showed the following results:
  breaking length — 2,610 m;
  rupture — 281 double bends;

wet-strength — 18% after staying for 120 min. in water;
soaking time in 10% $Na_2CO_3$ soluton — 22 min;
absorption capacity for the same solution with one-sided wetting for 180 sec. — 31 g/m².

As can be seen from this Example, when the mass of the active substance of external layer of the crosslinking agent grains is equal to 0.1%, paper with a coating containing such crosslinking agent practically did not differ from paper with the coating made from polyvinyl alcohol not treated with the crosslinking agent. This proves the necessity of establishing the lower limit for the mass of the active substance of the external layer of the crosslinking agent within 0.1% of the mass of the crosslinking agent nuclei.

EXAMPLE 6

Now realization of the present invention will be described for the case of preparing the crosslinking agent for the chemical treatment of polyvinyl alcohol aqueous solution. The crosslinking agent nuclei consisted of kaolin particles in the form of dry powder with maximum sizes of up to 30 microns. Kaolin was dispersed in water to a concentration of dry matter in the paste of 75%. Titanium tetrachloride in the amount of 1.6% of kaolin mass was added, under stirring, to the prepared paste.

Titanium tetrachloride was hydrolyzed to $\alpha$ - titanic acid, and, on completion of hydrolysis, crosslinking agent was obtained, which, as in Example 1, was converted into sizing dispersion and subsequently applied on similar paper under the same conditions.

The resulting paper with the coating containing the crosslinking agent had the following characteristics after the sizing composition had been applied in the amount of about 4 g/m²:
breaking length — 2,760 m;
rupture — 167 double bends;
wet strength — 20% after staying for 120 min. in water;
soaking time in 10% $Na_2CO_3$ solution — 31 min.;
absorption capacity for the same solution with one-sided wetting for 180 sec. — 27 g/m².

The results obtained in this Example are indicative of the fact that with an increase in the size of the crosslinking agent nuclei up to 30 microns, the results of its application for crosslinking of paper coatings are impaired.

EXAMPLE 7

In this Example realization of the present invention will be described for the process of preparing the crosslinking agent with the nuclei consisting of titanium dioxide particles in anatase form with sizes of up to 3 microns.

Titanium dioxide in the form of dry powder was impregnated with titanium tetrachloride taken in the amount of 1.6% of titanium dioxide mass. This was followed by adding water to the impregnated powder to a concentration of dry matter in the paste of about 60%. The crosslinking agent resulting from the hydrolysis of titanium tetrachloride was mixed with a 13% aqueous solution of polyvinyl alcohol and then acrylate latex was added into the resulting dispersion.

A sizing composition with 14.0% concentration of dry matter and the following ratio of the components was obtained:
crosslinking agent — 40%
polyvinyl alcohol — 55%
acrylate latex — 5%

This sizing composition, using a size press of a pilot papermaking machine, was applied on paper having a mass of 100 g/m² and produced from the pulp made as in Example 1 and having the same composition.

The coating was applied with the paper passing rate of 8 m/min. and with approximately 90% dryness of the paper entering the size press. After the surface sizing the paper passed through the drying unit with the maximum temperature of the drying cylinders of about 80° C., and was calendered on a calender with heated rolls to smoothness of about 10 sec. by Beck. The amount of the sizing composition applied was about 4 g per m² of paper. The paper thus produced had the following characteristics:
breaking through — 4,840 m;
rupture — 454 double bends;
wet strength — 26% after staying for 120 min. in water;
soaking time in II% $Na_2CO_3$ solution — 23 min.;
absorption capacity for the same solution with one-sided wetting for 180 sec. — 11 g/m².

Paper produced under the same conditions from the same pulp but unsized with said sizing compound from the surface had the following characteristics:
breaking length — 4,480 m;
rupture — 346 double bends;
wet strength — 25% after staying for 120 min. in water;
soaking time in 10% $Na_2CO_3$ solution — 5 min;
absorption capacity for the same solution with one-sided wetting for 180 sec. — 42 g/m².

The same paper was sized on a size press with a 15% aqueous solution of polyvinyl alcohol, then dried and calendered under the same conditions. Paper with the coating from non-crosslinked polyvinyl alchohol amounting to approximately 6 g/m² had the following characteristics:
breaking length — 4750 m;
rupture — 309 double bends;
wet strength — 25% after staying for 120 min. in water;
soaking time in 10% $Na_2CO_3$ solution — 8 min;
absorption capacity for the same solution with one-sided wetting for 180 sec. — 32 g/m².

As can be seen from this Example, paper with a coating containing the crosslinking agent is much superior, over a whole range of the characteristics considered, to uncoated paper as well as to paper with a coating made of non-crosslinked polyvinyl alcohol, despite the fact that the latter was applied in a considerably larger quantity.

EXAMPLE 8

In this Example realization of the present invention will be described for the case of secondary application of the sizing composition prepared as set forth in Example 7, paper with the coating containing the crosslinking agent and producted as in the same Example 7.

With the second passing of the paper with the coating through the size press of the papermaking machine, the total amount of the sizing composition applied was approximately 7 g per m² of paper. After having passed through the size press, paper was dried on the drying cylinders of the papermaking machine at a temperature not above 80° C. and was then calendered.

The resulting paper with a double coating had the following characteristics:

breaking length — 4,860 m;
rupture — 367 double bends;
wet strength — 27% after staying for 120 min. in water;
soaking time in 10% $Na_2CO_3$ solution — 52 min;
absorption capacity for the same solution with one-sided wetting for 180 sec. - 9 g/m².

As can be seen from this Example, paper with a double coating has a winter resistance comparable to that of paper coated with polyethylene; yet each side of the paper sheet is coated only with 3.5 g of the sizing composition per m² of paper, which also imparts high hydrophilic properties to the paper surface (its contact angle of wetting with water amounts to approximately 50°).

EXAMPLE 9

In this Example realization of the present invention will be described for the process of preparing the crosslinking agent with nuclei consisting of carbon black particles with sizes of up to 0.3 micron. Carbon black powder was dispersed in water until a paste containing approximately 30% of dry matter was produced.

Titanium tetrachloride in the amount of 1.6% by weight carbon black was added into said paste under stirring. Titanium tetrachloride was hydrolytically decomposed with the formation of α-titanic acid that settled on carbon black particles. From the crosslinking agent thus prepared a sizing dispersion was made as in Example 1, and then applied on the same grade of paper and under the same conditions. Paper with the coating containing the crosslinking agent, was made. The surface coating mass amounted to approximately 4 g per m² of paper. This paper had the following characteristics:

Breaking length — 2,860 m;
rupture — 351 double bends;
wet strength — 25% after staying for 120 min. in water;
soaking time in 10% $Na_2CO_3$ solution — 45 min;
absorption capacity for the same solution with one-sided wetting for 180 sec. — 18 g/m².

As can be seen from this Example, paper with the coating containing the crosslinking agent with carbon black particles serving as the inert nuclei displays good mechanical properties and high resistance to the penetration of water and aqueous solutions.

EXAMPLE 10

This Example will describe realization of the present invention for the process of preparing the crosslinking agent with the nuclei consisting of blanc fixe particles and particles of titanium dioxide in anatase form. The ratio of the components in the mixture mass is as follows: 80% of blanc fixe with sizes of particles of up to 8.1 microns and 20% of anatase titanium dioxide with the sizes of particles of up to 3 microns. The blanc fixe mixture was diluted with water to concentration of dry matter of about 44%, and then the required amount of titanium dioxide was added to this mixture under stirring.

A paste containing a mixture of flanc fixe and titanium dioxide particles with dry matter concentration of about 50% was formed after thorough stirring. This mixture was treated with titanium tetrachloride taken in the amount of 1.6% of the mass of dry substances in the mixture, as in Example 9.

Sizing dispersion was made from the prepared crosslinking agent, as described in Example 1, said dispersion was applied on paper passing through the size press of the papermaking machine described in the same Example 1. Paper pulp was prepared by following the procedure described in Example 1. The paper mass amounted to approximately 100 g/m². After surface sizing on the size press, paper was dried on cylinders with the surface temperature not exceeding 90° C., and then calendered. Paper thus produced had the following characteristics:
breaking length — 2,420 m;
rupture — 14 double bends;
wet strength — 36% after staying for 120 min. in water;
soaking time in 10% $Na_2CO_3$ solution — 20 min.;
absorption capacity for the same solution with one-sided wetting for 180 sec. — 34 g/m².

The amount of coating applied on this paper was approximately 1.5 g per m² of paper. This paper was then tested as a base for γφ-67 recording photographic paper. As control paper, paper of the same composition was used produced in the same machine, having a mass of 135 g per m² of paper and twice baryta-coated with the baryta layer applied in the amount of 33.4 g/m² of paper. Coating of the base with the photosensitive emulsion at a rate of 9.2 m/min. proceeded smoothly, without any complications, at the drying temperature of 40° C. festoons were formed without rolling up of the edges.

By its photographic properties γφ-67 recording photographic paper with a non-barytized base with the surface sizing containing the crosslinking agent meets the requirements on this type of paper, as well as the requirements on the control photographic paper sample with the twice barytized base having a mass of 168.4 g/m² paper. By visual observation no difference was detected between paper with the coating containing the crosslinking agent and control barytized paper with respect to the line sharpness.

As can be seen from this Example, paper with the coating, containing the crosslinking agent, made under industrial conditions on the papermaking machine with one horizontal size press had adequate water penetration resistance and high consumer properties with a moderate surface-coating mass, permitting the use of this paper in place of conventional twice barytized photographic paper base with a higher mass per m².

EXAMPLE 11

In this Example realization of the present invention will be described for the process of preparing the crosslinking agent for the chemical treatment involving an aqueous solution of gelatin having a concentration of 12.8 wt.%. The crosslinking agent was prepared in the following manner. Dry blanc fixe powder with particle sizes of up to 8.1 mm was impregnated with titanium tetrachloride taken in such an amount that the mass of ions of tetravalent titanium in the external layer of the grain should be 4% of the mass of the nuclei. The impegnated powder was hydrolytically treated with a 10% solution of ammonia, consumption of ammonia being 34–45% by weight of titanium tetrachloride. This was followed by the addition of water, under stirring, to approximately 50% concentration of dry matter in the paste. The thus prepared paste of crosslinking agent was divided into two parts, one of which was mixed with gelatin solution in the ratio of 12% crosslinking agent to 88% gelatin. The dry matter concentration in the dispersion thus prepared was on the order of 13%. This dispersion was applied on paper with 235 g/l m mass made from the pulp processed as in Example 1 and produced under the same conditions on the same papermaking machine. The sizing dispersion was applied as in Example 1.

The resulting paper with the coating containing the crosslinking agent with the surface coating mass amounting to approximately 5 g/m² had the following characteristics:
 breaking length — 3,720 m;
 rupture — 82 double bends;
 wet strength — 25% after staying for 120 min. in water;
 soaking time in 10% $Na_2CO_3$ solution — 48 min;
 absorption capacity for the same solution with one-sided wetting for 180 sec. — 31 g/m².

Uncoated paper had the following characteristics:
 breaking length — 3,530 m;
 rupture — 59 double bends;
 wet strength — 24% after staying for 120 min. in water;
 soaking time in 10% $Na_2CO_3$ solution — 36 min.;
 absorption capacity for the same solution with one-sided wetting for 180 sec. — 41 g/m².

The other part of the crosslinking agent was stored in a hermetically sealed container during 6 months at room temperature of 20° ± 5° C., and was then used for making the sizing dispersion described in this Example. When the latter was applied on the same paper under the same conditions with the same amount of the dispersion applied on 1 m² of paper, the resulting coated paper had characteristics which did not differ from those of paper made using a feshly prepared crosslinking agent.

As can be seen from this Example, paper with a coating containing gelatin, treated with the crosslinking agent, had a higher quality as compared to uncoated paper. The crosslinking agent was also shown not to change its capacity of forming chemical crosslinks after storing for 6 months.

EXAMPLE 12

Realization of the present invention will now be described for the case of chemical, treatment of a 3% aqueous solution of potato starch with the crosslinking agent prepared as in Example 1 for applying a crosslinked coating on the same paper and under the same conditions. The sizing dispersion was prepared by mixing the crosslinking agent with the starch solution in the ratio of 50% crosslinking agent to 50% starch.

The resulting dispersion with approximately 5% dry matter content, after having been applied on paper, formed a coating having a mass of 2 g/m². The resulting paper with the coating containing starch treated with the crosslinking agent had the following characteristics:
 breaking lenght — 2,580 m;
 rupture — 150 double bends;
 wet strength — 19% after staying for 120 min. in water;
 soaking time in 10% $Na_2CO_3$ — 24 min.;
 absorption capacity for the same solution with one-sided wetting for 180 sec. — 29 g/m².

As can be seen from this Example, paper even with a moderate application of the sizing compound containing the crosslinking agent, displays appreciably improved physicomechanical properties.

All tests of paper were carried out after having been conditioned same at an air humidity of 65% and at ambient temperature of 20° C.

The paper soaking time was ascertained by the moment of change in the coloration of eosin particles sprayed on the surface of a paper box floating in a 10% aqueous test solution of soda from the moment this paper box submerged in said solution.

All the above Examples show that the herein-proposed crosslinking agent makes possible a substantial facilitation of the technological process of producing waterproof coatings for various grades of paper, permits the use of the now-existing equipment, and allows a substantial improvement in the quality of the product.

It is to be understood that various changes can be made by those skilled in the art in the method of producing the crosslinking agent, and into the crosslinking agent as such which have been described hereinabove by way of illustration only, without departing from the true spirit and scope of the invention.

What is claimed is:

1. Paper comprising a fibrous base and a coating applied on said fibrous base containing a hydroxyl-containing water-soluble polymer treated with a crosslinking agent in the form of grains having a nucleus-consisting of a solid carrier and an external layer surrounding said nucleus containing a compound of a tetravalent metal selected from the group consisting of titanium, zirconium, hafnium, and tin, said compound of said tetravalent metal being capable of effecting crosslinking of said polymer and said carrier being inert to said compound.

2. Paper as claimed in claim 1, wherein a photographic paper base is said fibrous base.

3. Paper as claimed in claim 1, wherein polyvinyl alcohol is said hydroxyl-containing water-soluble polymer.

4. Paper as claimed in claim 1, wherein gelatin is said hydroxyl-containing water-soluble polymer.

5. Paper as claimed in claim 1, wherein starch is hydroxyl-containing water-soluble polymer.

6. Paper as claimed in claim 1 wherein said water soluble polymer is selected from the group consisting of polyvinyl alcohol, gelatin and starch.

7. Paper as claimed in claim 1 wherein the size of the nuclei in the grains of the crosslinking agent does not exceed 30 microns.

8. Paper as claimed in claim 1 wherein the mass of the external layer of the grains of the crosslinking agent is 0.1 to 4.0% of the nucleus mass.

9. Paper as claimed in claim 1 wherein said compound of a tetravalent metal is α-titanic acid.

10. Paper as claimed in claim 1, wherein the inert carrier is blanc fix.

11. Paper as claimed in claim 1 wherein the inert carrier is kaolin.

12. Paper as claimed in claim 1 wherein the inert carrier is titanium dioxide.

13. Paper as claimed in claim 1 wherein the inert carrier is carbon black.

14. Paper as claimed in claim 1 wherein the inert carrier is a mixture of particles of blanc fixe, kaolin, titanium dioxide and carbon black.

15. Paper as claimed in claim 1 wherein the inert carrier is a dry pigment.

16. Paper as claimed in claim 1 wherein said compound of a tetravalent metal is a hydrolysis product of a hydrolyzable compound of said tetravalent metal.

17. Paper as claimed in claim 16 wherein the hydrolyzable compound of a tetravalent metal is titanium tetrachloride.

* * * * *